United States Patent [19]
Li

[11] Patent Number: 5,221,323
[45] Date of Patent: Jun. 22, 1993

[54] METHOD OF PRODUCING MAGNETIC POWDERS FROM HEAVY METAL SLUDGES

[76] Inventor: Chung-Lee Li, No. 8. Shih-Shan Tien, Lung-Hsing Tsun, Chung-Pu Hsiang, Chia-Yi Hsien, Taiwan

[21] Appl. No.: 770,852

[22] Filed: Oct. 3, 1991

[51] Int. Cl.⁵ .......................... C22B 9/10; B22F 9/20
[52] U.S. Cl. ...................... 75/347; 75/348; 75/353; 75/961; 588/232
[58] Field of Search ............... 75/347, 348, 353, 961, 75/962; 588/232, 236, 237

[56] References Cited

U.S. PATENT DOCUMENTS

| | | | |
|---|---|---|---|
| 4,409,020 | 10/1983 | Holman et al. | 75/348 |
| 4,420,401 | 12/1983 | Kretas et al. | 588/236 |

FOREIGN PATENT DOCUMENTS

| | | | |
|---|---|---|---|
| 1211292 | 9/1986 | Canada | 75/961 |
| 2505470 | 4/1986 | Fed. Rep. of Germany | 75/353 |
| 279692 | 6/1990 | German Democratic Rep. | 75/961 |
| 1210988 | 2/1986 | U.S.S.R. | 75/353 |

*Primary Examiner*—George Wyszomierski
*Attorney, Agent, or Firm*—Ladas & Parry

[57] ABSTRACT

A preparation method of magnetic powders by using ferric compounds added to heavy metal sludges, and then heating under an atmosphere control and at adequate temperature so as to convert heavy metal sludges into magnetic ferrite powders. Owing to the obtained magnetic ferrite powders possess strong surface activity and cannot dissolve in weak acid or alkaline solution, they can be widely applied on waste water treatments.

14 Claims, 5 Drawing Sheets

METHOD OF PRODUCING MAGNETIC POWDERS FROM HEAVY METAL SLUDGES

BACKGROUND OF THE INVENTION

The present invention relates to a method of producing magnetic powders from heavy metal sludges, in particular, to a method of producing magnetic powders by adding an adequate stoichiometric amount of ferric compounds to heavy metal sludges and controlling the temperature and atmosphere, the heavy metal sludges are converted into ferrite powders having a strong magnetic characteristic.

The sources of heavy metal sludges come from the treatments of waste water containing heavy metals. Waste water containing heavy metals is usually obtained from the effluent liquids of electroplating industry, acid treatment of waste hardware, treatment of metal surface membrane such as the treatment of chlorate membrane, anode treatment, and phosphate treatment. For environmental protection reasons, these effluent liquids should be adequately treated before they are discharged into drains. Currently, the neutralizing precipitation method includes the steps of precipitating heavy metals to form sludges and discharging solution under effluent standards for environmental requirements. However, the accumulative amount of formed sludges is very large. The formed sludge will produce serious treatment problems because the sludges contain heavy metal components which may be toxic. If the heavy metal sludges are buried, quite a large area for storage is required. Moreover, the heavy metal sludges normally contain hydroxide, and the heavy metals will immediately dissolve out after its contacting with acid solution The present invention is to provide a low cost and economical technology for treating the heavy metal sludges of which traditional treatment requires high cost or high difficulty. The method according to the present invention is directed to the adding of ferric compounds, e.g., ferric hydroxide or ferric oxide to the heavy metal sludges, mixing homogeneously under an atmosphere control and at adequate temperature so as to convert heavy metal sludges into ferrite powders with strong magnetism. The present technology not only converts wastes originally requiring difficult treatments into magnetic powders, but also is widely applied in waste water treatments for the purpose of re-utilizing and avoiding serious pollutions caused by such a large amount of heavy metal sludges.

SUMMARY OF THE INVENTION

It is therefore an object of the present invention to provide a method of producing magnetic ferrite powders which mitigates the environmental problems and drawbacks.

It is another object of the present invention to provide magnetic ferrite powders which possess strong surface activity and excellent magnetism and cannot dissolve in weak acid or alkaline solution, can be widely applied on waste water treatments.

Another object of the present invention is to provide a method of producing magnetic powders which converts heavy metal sludges requiring high cost or high technology treatments into magnetic powders so as to solve environmental pollution problems.

A further object of the present invention is to provide a method of producing magnetic powders of which the operation is simple and cost is low.

These and other objects, advantages and features of the present invention will be more fully understood and appreciated by reference to the written specification and appended drawings.

BRIEF DESCRIPTION OF THE DRAWINGS

The present invention will be further explained with reference to the annexed drawings, wherein.

DETAILED DESCRIPTION OF THE INVENTION

Figure 1:
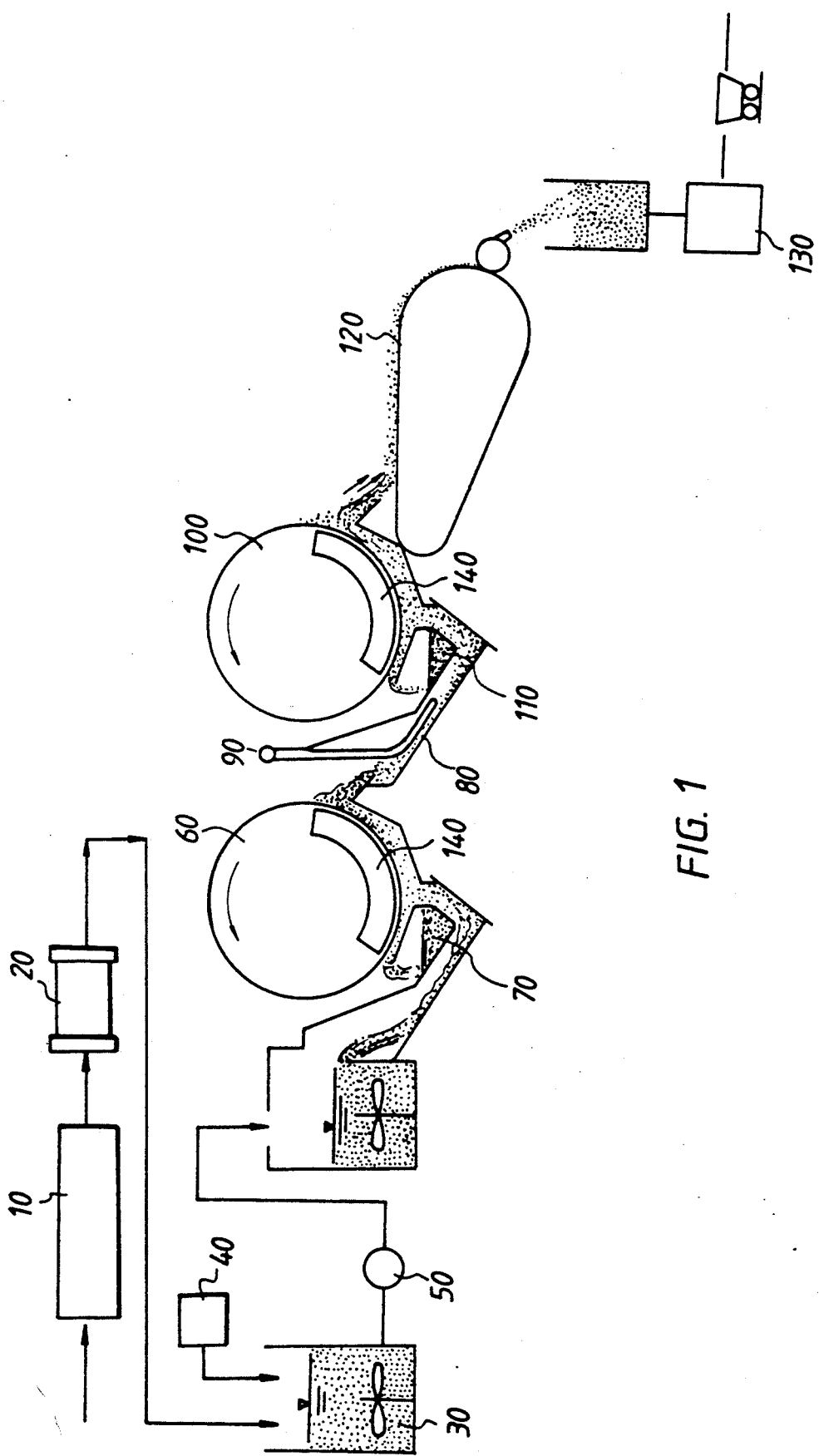
FIG. 1 is a schematic view showing the method of producing magnetic powders from heavy metal sludges in accordance with the present invention.

This present invention relates to a method of producing magnetic powders from heavy metal sludges by using ferric compounds added to heavy metal sludges under suitable conditions and operations to convert heavy metal sludges into magnetic ferrite powders. The process in accordance with this invention comprises the steps of:

(a) after heavy metal sludges being dried, adding an adequate stoichiometric amount of ferric compounds to the heavy metal sludges to obtain a mixture, while stirring;

(b) heating the mixture in an oven at 500°–1400° C. for about 1–10 hours, and then cooling to the temperature below 200° C.;

(c) grinding the mixture obtained from high temperature treatments into powders in a ball mill;

(d) separating magnetic powders from a magnetic separator after inorganic sodium salts as a dispersing agent being added to the ground powders;

(e) recovering non-magnetic materials as raw materials for reuse; and (f) dewatering and drying the magnetic powders, after wash and separation in magnetic separator again, to obtain the desired product.

The ferric compound added to the heavy metal sludges in the process according to the invention could be ferric hydroxide, ferric oxide, ferric carbonate, ferric sulfide, ferric sulfate and ferric chloride.

While heating, the atmosphere in the high temperature oven is vacuum, nitrogen gas, inert gas or any reducing gases. Preferably, the atmosphere of nitrogen is used in the present preferred embodiment.

The period for grinding is preferred of about 1–12 hours. After grinding, inorganic acid solution with a concentration of below 1N is added to the powders at a ratio of liquid to solid by weight of above 4 to impregnate the materials for about 30 minutes and to remove the non-magnetic materials. The ratio of liquid to solid by volume is preferred to be about 10. The inorganic acid solution is selected from a group consisting of a solution of sulfuric acid, hydrogen chloride, phosphoric acid, hydrogen fluoride or nitric acid.

In accordance with the present invention, the inorganic sodium salt used as a dispersing agent can be selected from sodium phosphate, sodium sulfate, sodium silicate and sodium chlorate. The preferred concentration for inorganic sodium salt is 0.01-0.0001 M.

The heavy metal sludges are commonly composed of hydroxides, carbonates and sulfides, and are easily converted into oxides above 400° C. in air. Heavy metals in heavy metal sludges are normally ions with two charges, such as ions of V, Cr, Mn, Fe, Co, Ni, Cu, Zn, Pb, Cd, etc. After mixing with ferric oxide, these heavy metal oxides can obtain spinel ferrite powders with strong magnetism by treatments at high temperature according to the following reaction formula $$MO + Fe_2O_3 \rightarrow MFe_2O_4$$

Hence, a stoichiometric amount of ferric hydroxide, ferric sulfate, ferric oxide or ferric carbonate is added to the heavy metal sludges. After vigorously mixing and sintering, ferrite magnetic powders with strong magnetism are produced. The spinel ferrite magnetic powders only dissolve in strong acid, but do not dissolve in weak acid or alkaline solution, and have strong surface activity. Therefore, the ferrite magnetic powders are applied in oil absorption of oil-containing waste waters, decolorizing treatment of dying water and deletion of suspended solid and heavy metals. Furthermore, the ferrite powders are also used to separate poisonous gases of gas stream, such as $NO_x$, $CO$, $SO_2$, $H_2S$, etc. The polluted rivers and lakes can also be treated with the ferrite powders produced according to the method of the invention. The wide applications on the product of the invention will create added value.

The method of the invention will be described below in details. FIG. 1 is a schematic view showing a flow chart according to the present invention for producing magnetic ferrite powders. Referring now to FIG. 1. The adequate stoichiometric amount of ferric hydroxide, ferric sulfate, ferric oxide or ferric carbonate is added to the heavy metal sludges. After vigorously stirring, the sludge mixture is placed into a high temperature oven 10 which can be controlled an atmosphere of suitable gases and heated at the temperature of 500°-1,400° C. for 1-10 hours. The magnetic ferrite powders formed in the oven are sent to a ball mill 20 for grinding. The ground ferrite powders are then discharged to a tank 30 for adjustment. Weak acid solution as a leaching agent 40 is added to the tank 30 so as to delete non-magnetic materials of the mixture. Alternatively, inorganic sodium salts can also be added to the tank 30 for dispersing non-magnetic materials in the way of stirring. After leaching or stirring, the sludge is pumped by a pump 50 into magnetic separator 60 so as to proceed magnetic separation. The separated non-magnetic materials are discharged into a container 70 and then recovered after filtration as raw materials. Subsequently, the magnetic solids are discharged into a washing tank 80 of which water from source 90 is infused to wash the solids. After washing, the solids are discharged into another magnetic separator 100 to proceed magnetic separation again. The washing liquid containing non-magnetic materials is discharged into a container 110 of which the non-materials can be combined with other non-materials from the container 70 for further treatments. The magnetic solids are dewatered in a dewaterer 120, and then dried in an oven 130. The magnetic powders are the resultant product of the present invention.

Since ferrite powders only dissolve in strong acid, but do not dissolve in weak acid or alkaline solution, surfaces of ferrite powders have strong surface activity and excellent magnetism of the ferrite powders, the separation of solid and liquid can be reached in a external magnetic field. The method of the present invention can be utilized in treating oil and grease of waste and solid suspension, deleting heavy metals and decolorizing waste water of dying. Furthermore, it can also be used to delete organic materials and biological materials, such as algae, bacteria, viruses, etc. It can also be used to separate the poisonous gases of gas streams, for example $NO_x$, $CO$, $SO_2$ and $H_2S$. The present method in accordance with the present invention not only re-utilizes heavy metal sludges but also solves serious pollution problems. That is, the present invention can simultaneously reach two purposes of re-utilizing resources and preventing pollution.

The following examples are offered by way of illustration. The examples are not intended to be limiting to the scope of the invention in any respect and should not be so construed.

EXAMPLES

Example 1

After neutralizing precipitation, the components of a sludge, i.e., sample 1, obtained from some electroplating plant are analyzed and listed in below Table 1.

TABLE 1

| Fe % | Ni % | Cu % | Zn % |
|---|---|---|---|
| 0.86 | 24.07 | 2.61 | 21.55 |

Figure 2:
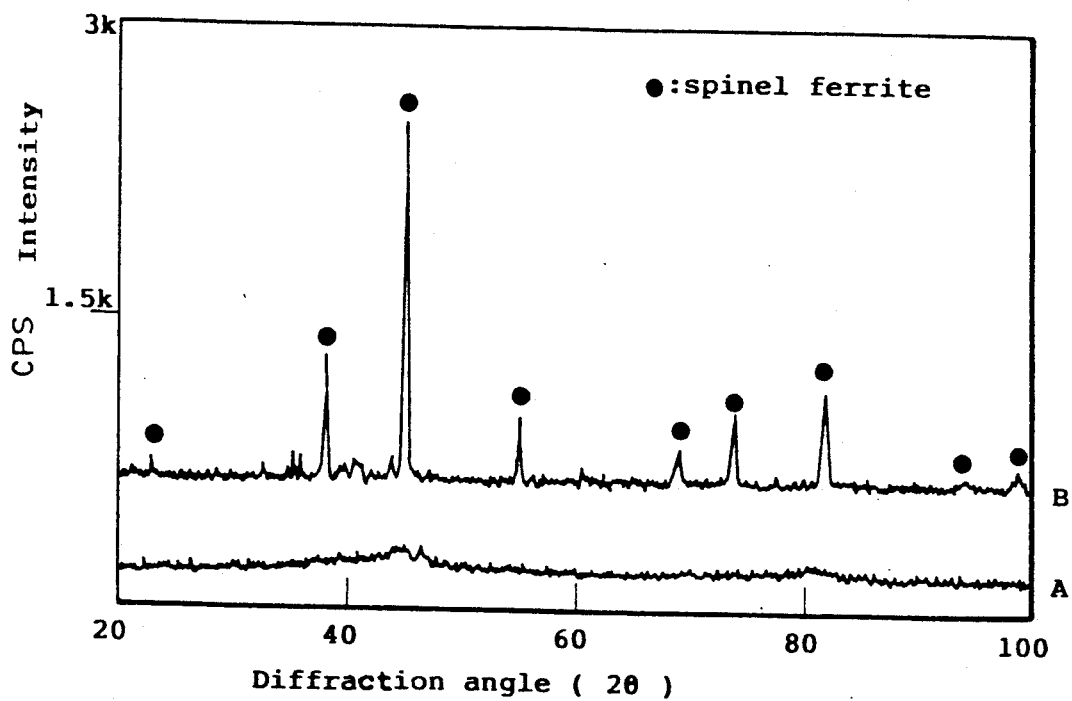
FIG. 2 is x-ray diffraction pattern of sample 1, wherein A is untreated and B is treated from electroplating plants sludges.
Figure 4:
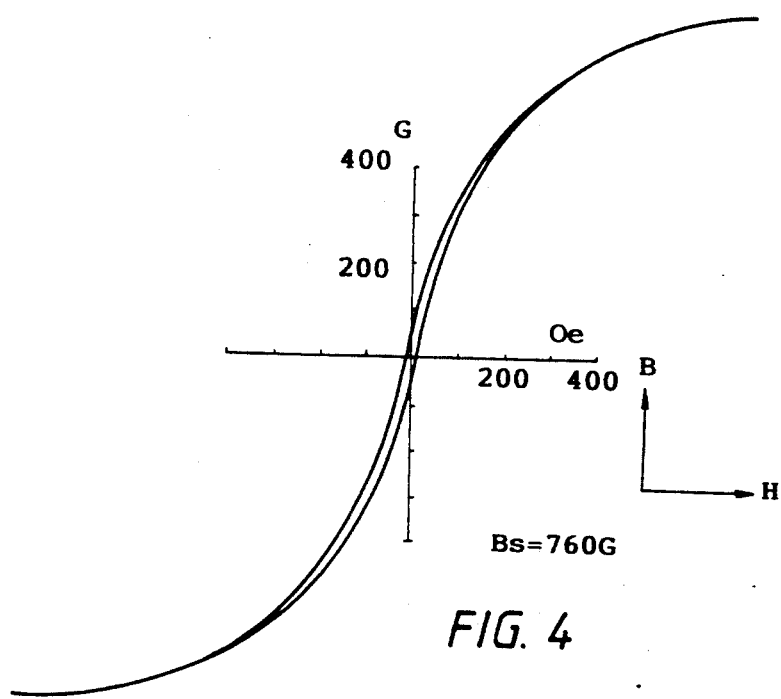
FIG. 4 is hysteresis loop curve of sample 1 treated from electroplating plant sludges.

A stoichiometric amount of ferrite hydroxide is added to the sludge, i.e., 52.3 grams ferric hydroxide are added to 100 grams sludges. After vigorously stirring, the mixture is placed into a high temperature oven and heated at 1200° C. for 2 hours under an atmosphere of nitrogen, and then taken out of the oven after cooling to a temperature below 200° C. After grinding, the formed powders are observed by x-ray diffraction (XRD). The x-ray diffraction patterns are shown in FIG. 2, wherein A is non-crystal structure of untreated sample 1 and B is spinel ferrite crystal structure from sample 1 treated in accordance with the present invention. The results of hysteresis loop curves are shown in FIG. 4, wherein saturated magnetization (Bs) is 760 Gauss.

Example 2

After neutralizing precipitation, the components of a sludge, i.e., sample 2, obtained from some IC plate plant are analyzed and listed in below Table 2.

TABLE 2

| Fe % | Ni % | Cu % | Zn % |
|---|---|---|---|
| 39.85 | 0.52 | 8.74 | 0.10 |

Figure 3:
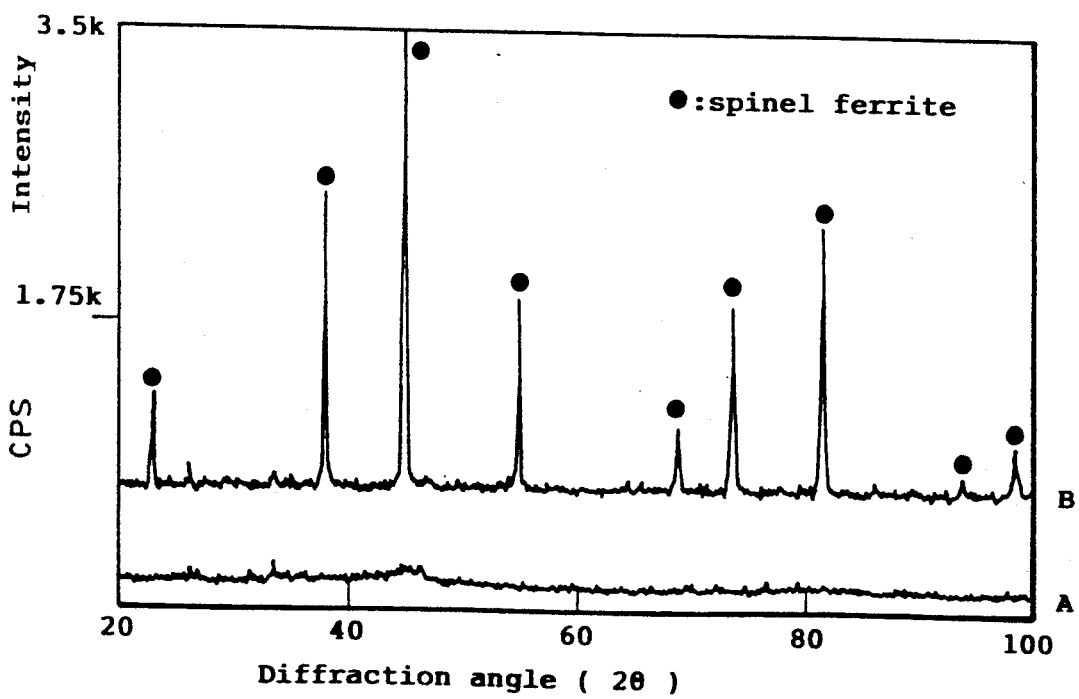
FIG. 3 is x-ray diffraction pattern of sample 2, wherein A is untreated and B is treated from IC plants sludges.
Figure 5:
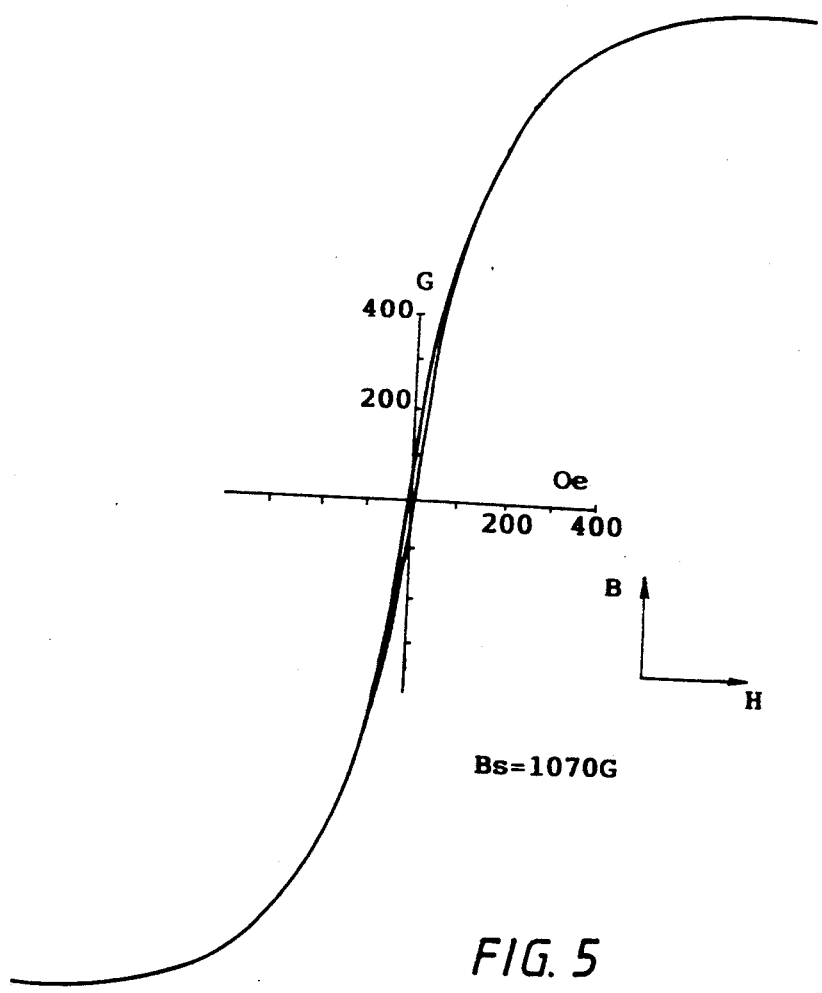
FIG. 5 is hysteresis loop curve of sample 2 treated from IC plant sludges.

Owing to the high content of Fe, the sludge can be directly placed into a high temperature oven and heated at 1000° C. for 2 hours under an atmosphere of nitrogen, and then taken out the oven after cooling to a temperature below 200° C. After grinding, the formed powders are observed by x-ray diffraction (XRD). The x-ray diffraction patterns are shown in FIG. 3, wherein A is non-crystal structure of untreated sample 2 and B is spinel ferrite crystal structure from sample 2 treated in accordance with the present invention. The hysteresis loop curves are shown in FIG. 5, wherein Bs is 1070 Gauss.

Example 3

After neutralizing precipitation, the components of a sludge, i.e., sample 3, obtained from some hardware plant, are analyzed and listed in below Table 3.

TABLE 3

| Fe % | Ni % | Cu % | Zn % |
|------|------|------|------|
| 44.03 | 0.10 | 0.22 | 0.05 |

Figure 6:
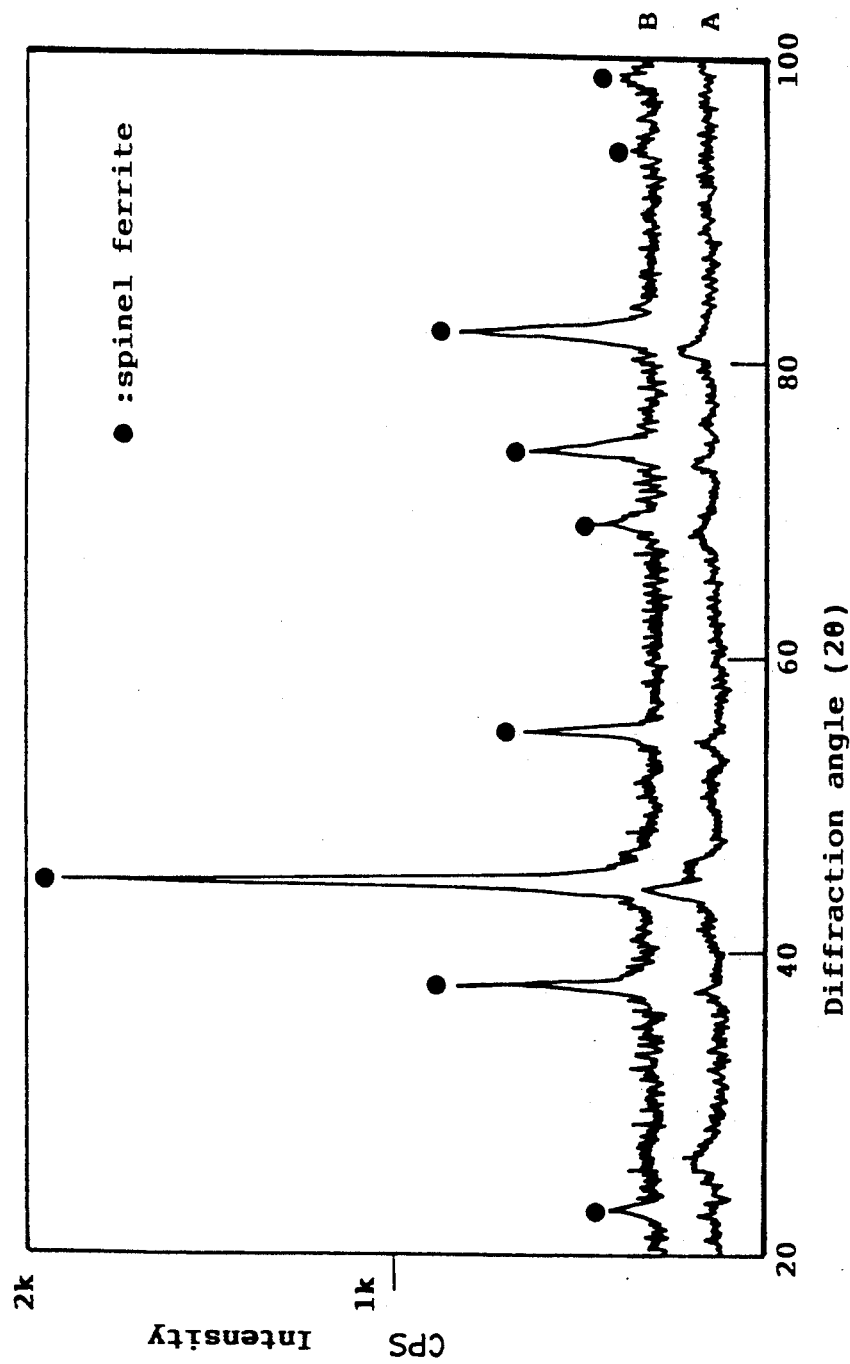
FIG. 6 is x-ray diffraction patterns of a mixture of sample 3 and sample 1, wherein A is untreated and B is treated from hardware and electroplating plants sludges.
Figure 7:
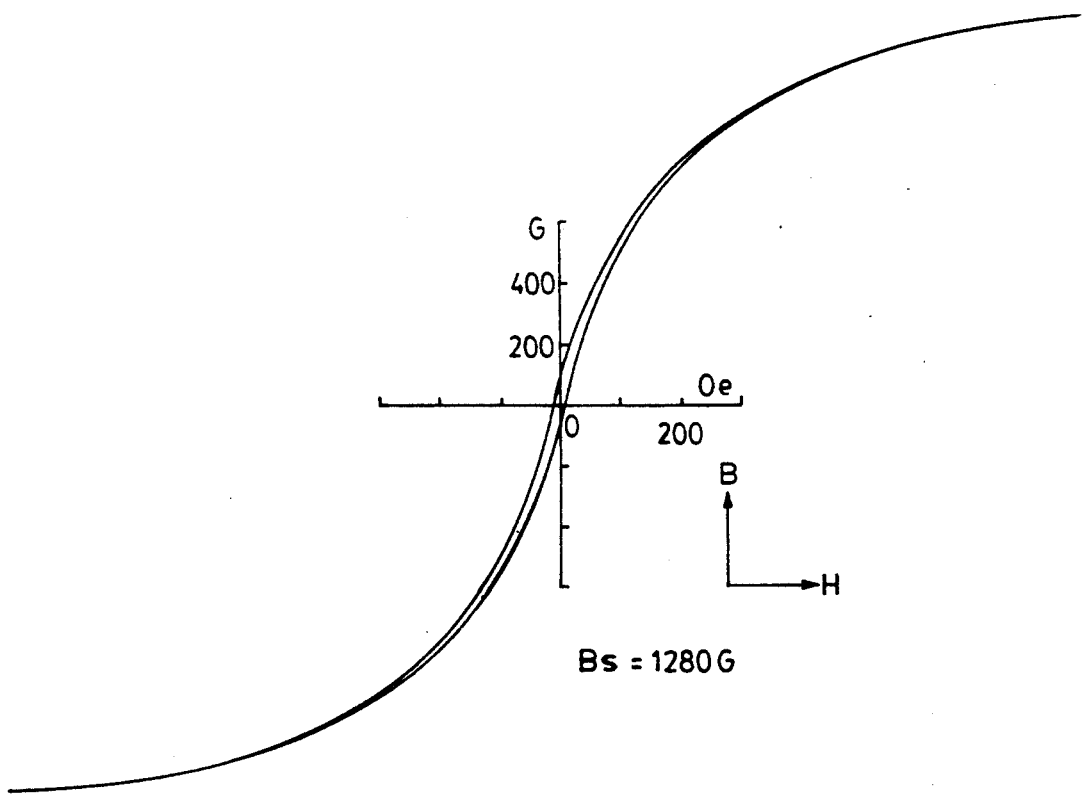
FIG. 7 is hysteresis loop curve of a mixture of sample 3 and sample 1 treated from hardware and electroplating plants sludges.

50 gram sludges of example 1 are added to 100 gram sludges of sample 3. After vigorously stirring, the mixture is placed into an oven and heated at 1200° C. for 2 hours under an atmosphere of nitrogen, and then taken out the oven after cooling to a temperature below 200° C. After grinding, the formed powders are observed by x-ray diffraction. The x-ray diffraction patterns are shown in FIG. 6, wherein A represents the original mixed sludges with poor crystallinity and B represents the spinel ferrite structure from sludge treated according to the present invention. The results of hysteresis loop curves are shown in FIG. 7, wherein Bs is 1280 Gauss.

Of course it is understood that the above is merely a preferred embodiment of the invention and that various changes and alterations can be made without departing from the spirit and broader aspects thereof as set forth in the appended claims.

I claim:

1. A method of treating heavy metal sludges to produce magnetic powders comprising the steps of
   (a) mixing a stoichiometric amount of a ferric compound or compounds into the heavy metal sludges while stirring to form iron oxide compounds of the formula $MFe_2O_4$, wherein M is a heavy metal ion;
   (b) heating the mixture in an oven at 500°–1400° C. for about 1–10 hours, and then cooling to a temperature below 200° C.;
   (c) grinding the heated and cooled mixture into ground powders in a ball mill whereby to form a resultant mixture comprising magnetic powders and non-magnetic materials;
   (d) dispersing the non-magnetic materials by adding an inorganic sodium salt or salts to the resultant mixture and separating the magnetic powders from the non-magnetic materials with a magnetic separator;
   (e) recovering the non-magnetic materials as raw materials for reuse; and
   (f) washing, recovering, dewatering and drying the separated magnetic powders.

2. A method as set forth in claim 1, wherein the ferric compound is selected from the group consisting of ferric hydroxide, ferric oxide, ferric carbonate, ferric sulfide, ferric sulfate and ferric chloride.

3. A method as set forth in claim 1, wherein the mixture in step (b) is heated in the oven in a vacuum.

4. A method as set forth in claim 1, wherein the mixture in step (b) is heated in the oven in nitrogen gas or an inert gas or gases.

5. A method as set forth in claim 1, wherein the mixture in step (b) is heated in the oven in reducing gases.

6. A method as set forth in claim 1, wherein the mixture of step (c) is ground in the ball mill for 1–12 hours.

7. A method as set forth in claim 1, wherein the non-magnetic materials are removed from the resultant mixture by adding inorganic acid solution with a concentration of below 1N at a ratio of liquid to solid by weight of above 4 to leach the materials for 10–40 minutes.

8. A method as set forth in claim 7, wherein the ratio of liquid to solid by volume during the removal of the non-magnetic materials is about 10.

9. A method as set forth in claim 7, wherein the inorganic acid solution is a solution comprising an inorganic acid selected from the group consisting of sulfuric acid, hydrogen chloride, phosphoric acid, hydrogen fluoride and nitric acid.

10. A method as set forth in claim 1, wherein the inorganic sodium salt is selected from the group consisting of sodium phosphate, sodium sulfate, sodium silicate and sodium chlorate.

11. A method as set forth in claim 10, wherein the concentration of the inorganic salt or salts is 0.01–0.0001 M.

12. A method as set forth in claim 1, wherein the concentration of the inorganic sodium salt or salts in 0.01–0.0001 M.

13. A method as set forth in claim 1, wherein electromagnets are used as an external magnetic field for magnetic separation in the magnetic separator of step (d).

14. A method as set forth in claim 1, wherein permanent magnets are used as an external magnetic field for magnetic separation in the magnetic separator of step (d).

* * * * *